(12) United States Patent
Inch et al.

(10) Patent No.: US 11,836,205 B2
(45) Date of Patent: Dec. 5, 2023

(54) ARTIFICIAL REALITY BROWSER CONFIGURED TO TRIGGER AN IMMERSIVE EXPERIENCE

(71) Applicant: Meta Platforms Technologies, LLC, Menlo Park, CA (US)

(72) Inventors: Joshua Jacob Inch, Eastsound, WA (US); Henricus Maria Cabanier, Seattle, WA (US); Cristobal Alvaro Castilla Lacomba, Seattle, WA (US); Reilly Donovan, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/724,597

(22) Filed: Apr. 20, 2022

(65) Prior Publication Data

US 2023/0342409 A1 Oct. 26, 2023

(51) Int. Cl.
*G06F 16/954* (2019.01)
*G06F 3/01* (2006.01)
(Continued)

(52) U.S. Cl.
CPC ......... *G06F 16/954* (2019.01); *G02B 27/017* (2013.01); *G06F 3/011* (2013.01);
(Continued)

(58) Field of Classification Search
CPC .... G06F 16/954; G06F 3/011; G06F 3/04815; G06F 3/0482; G06F 3/04847; G06T 19/006; H04L 67/02; G02B 27/017
See application file for complete search history.

(56) References Cited

U.S. PATENT DOCUMENTS 10,592,064 B2 * 3/2020 Ames .................... G06F 1/1694
10,948,997 B1 3/2021 Victor-Faichney et al.
(Continued)

FOREIGN PATENT DOCUMENTS

CN 101996077 A * 3/2011
EP 3719616 A1 10/2020

OTHER PUBLICATIONS

International Search Report and Written Opinion for International Application No. PCT/US2023/018759, dated Jun. 14, 2023, 9 pages.

(Continued)

*Primary Examiner* — Jeffery A Brier
(74) *Attorney, Agent, or Firm* — Potomac Law Group, PLLC

(57) ABSTRACT

Aspects of the disclosure are directed to an artificial reality (XR) browser configured to trigger an immersive experience. Implementations display an element at a browser chrome of the XR browser when an immersive experience is loaded. For example, the XR browser can include an application programming interface (API) that supports configuration of a browser chrome element by components of a webpage. The API call can cause the display of the browser chrome element, change a display property for the browser chrome element, or configure the browser chrome element in any other suitable manner. Upon receiving input at the browser chrome element (configured by the API call), the XR browser can transition from displaying a two-dimensional panel view of a webpage supported by loaded web resources (e.g., hypertext transfer protocol (HTTP) pages, graphic images, etc.) to a three-dimensional environment supported by preloaded immersive resources (e.g., three-dimensional models, graphic images, etc.).

20 Claims, 15 Drawing Sheets

(51) Int. Cl.

| | | |
|---|---|---|
| *G06F 3/04815* | (2022.01) | |
| *G06F 3/04847* | (2022.01) | |
| *H04L 67/02* | (2022.01) | |
| *G06T 19/00* | (2011.01) | |
| *G06F 3/0482* | (2013.01) | |
| *G02B 27/01* | (2006.01) | |

(52) U.S. Cl.
CPC ........ *G06F 3/0482* (2013.01); *G06F 3/04815* (2013.01); *G06F 3/04847* (2013.01); *G06T 19/006* (2013.01); *H04L 67/02* (2013.01)

(56) References Cited

U.S. PATENT DOCUMENTS

| | | |
|---|---|---|
| 2008/0155118 A1 | 6/2008 | Glaser et al. |
| 2009/0103780 A1 | 4/2009 | Nishihara et al. |
| 2009/0279784 A1 | 11/2009 | Arcas et al. |
| 2010/0050219 A1 | 2/2010 | Angiolillo et al. |
| 2010/0208033 A1 | 8/2010 | Edge et al. |
| 2010/0332996 A1 | 12/2010 | Sarkaria |
| 2012/0249797 A1 | 10/2012 | Haddick et al. |
| 2014/0019609 A1 | 1/2014 | Williams et al. |
| 2014/0037218 A1* | 2/2014 | Zweig ................ G06F 16/5866 382/218 |
| 2014/0316990 A1 | 10/2014 | Winston |
| 2015/0179147 A1 | 6/2015 | Rezaiifar et al. |
| 2017/0003750 A1 | 1/2017 | Li |
| 2018/0143757 A1* | 5/2018 | Champion ......... G06F 3/04845 |
| 2018/0322674 A1 | 11/2018 | Du |
| 2018/0361258 A1 | 12/2018 | Malyuk |
| 2019/0035152 A1 | 1/2019 | Kazansky |
| 2019/0197780 A1 | 6/2019 | Rao |
| 2019/0213792 A1 | 7/2019 | Jakubzak et al. |
| 2019/0287307 A1 | 9/2019 | Rogers et al. |
| 2019/0295101 A1 | 9/2019 | Porter et al. |
| 2019/0302895 A1 | 10/2019 | Jiang et al. |
| 2019/0310757 A1 | 10/2019 | Lee et al. |
| 2019/0347762 A1 | 11/2019 | Hwang et al. |
| 2020/0089390 A1* | 3/2020 | Bakhash ............. G06F 3/04817 |
| 2020/0151965 A1 | 5/2020 | Forbes et al. |
| 2020/0193649 A1 | 6/2020 | Moon et al. |
| 2020/0279044 A1 | 9/2020 | Lum et al. |
| 2020/0293178 A1 | 9/2020 | Kumar et al. |
| 2020/0320794 A1 | 10/2020 | Huang et al. |
| 2020/0401687 A1* | 12/2020 | Mak ..................... G06T 19/006 |
| 2021/0103447 A1 | 4/2021 | Wei et al. |
| 2021/0124475 A1 | 4/2021 | Inch et al. |
| 2021/0252392 A1 | 8/2021 | Stevens |
| 2021/0375065 A1 | 12/2021 | Cannefax et al. |
| 2022/0254114 A1 | 8/2022 | Frederick et al. |
| 2022/0308716 A1 | 9/2022 | Rice |
| 2022/0387873 A1 | 12/2022 | Hall et al. |
| 2022/0414487 A1 | 12/2022 | Si et al. |
| 2023/0092103 A1 | 3/2023 | Puyol et al. |

OTHER PUBLICATIONS

International Search Report and Written Opinion for International Application No. PCT/US2023/025680, dated Sep. 8, 2023, 11 pages.

* cited by examiner

ARTIFICIAL REALITY BROWSER CONFIGURED TO TRIGGER AN IMMERSIVE EXPERIENCE

TECHNICAL FIELD

The present disclosure is directed to an artificial reality browser configured to trigger an immersive experience.

BACKGROUND

Display systems can display content to users in a variety of formats that match user preferences or use cases. However, content can have a variety of display configurations, and effectively displaying content in accordance with user selections and/or expectations remains a challenge. For example, web content that includes immersive experiences can have a variety of different configurations that are specific to design choice, implemented technology, model selection, or other suitable configurations. Due to this diversity, users can encounter unexpected display artifacts and/or navigation that fails to achieve intuitive results.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
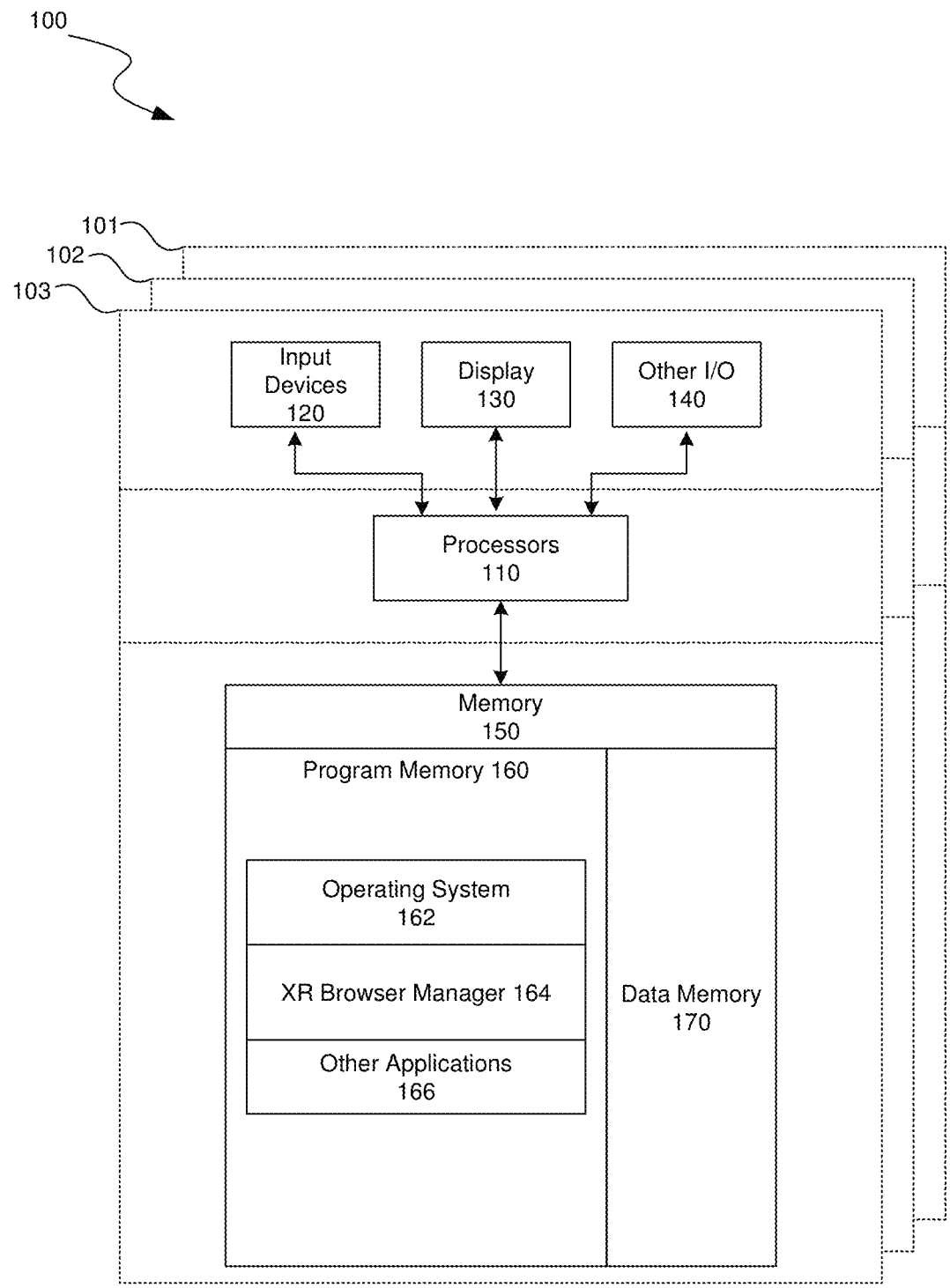
FIG. 1 is a block diagram illustrating an overview of devices on which some implementations of the present technology can operate.

Aspects of the present disclosure are directed to an artificial reality browser configured to trigger an immersive experience. A web browser can display content from a public network (e.g., the Internet) such as via the host of a webpage, a content distribution network, or any other network source of web content. The artificial reality browser can be configured to display both a two-dimensional display to a user, such as a standard webpage, and an immersive experience, such as a three-dimensional environment. A two-dimensional display, webpage, site may be a traditional 2D panel or may include some 3D content, such as a 3D model that is provided in associating with the webpage or that is viewed with parallax effects. The web browser can retrieve/receive resources according to the execution of code and/or scripts (e.g., JavaScript) implemented as part of the webpage/web content.

In some implementations, immersive resources are loaded by the artificial reality browser (e.g., preloaded and/or dynamically loaded) after display of a webpage (e.g., homepage, landing page, or any other suitable portion). For example, a landing page that includes limited web resources may load quickly while an immersive experience of a three-dimensional environment may take more time to load. Accordingly, the resources for the immersive experience may load while the landing page (e.g., two-dimensional webpage) is displayed to the user. Any other suitable webpage can be displayed while resources for an immersive experience are received, retrieved, initiated, and/or configured.

In some implementations, the artificial reality browser includes a display panel, which displays a two-dimensional webpage/content retrieved from the public network, and a browser chrome, which displays interface/control elements for configuring and interacting with the artificial reality browser itself. For example, a button displayed in the display panel can trigger a webpage function (e.g., navigation to a next webpage, submission of a web form, etc.) while a button displayed at the browser chrome can trigger browser functionality (e.g., bookmark functions, user preferences, etc.).

Implementations display an element at the browser chrome of an artificial reality browser when an immersive experience is loaded (e.g., is available to be experienced by the user). For example, the user can select the displayed element (e.g., press a displayed button) and trigger a transition from a two-dimensional panel-based display to a three-dimensional immersive experience. Implementations of the artificial reality browser include an application programming interface (API) that supports configuration of the browser chrome element by files, scripts, resources, or other suitable components of a webpage. For example, a component of the webpage can make an API call once the relevant resources for an immersive experience are loaded at the artificial reality browser. The API call can cause the display of the browser chrome element, change a display property for the browser chrome element (e.g., transition from a greyed-out button, which represents an inactive status, to a colored button, which represents an active status), or configure the browser chrome element in any other suitable manner.

In some implementations, in response to input at the browser chrome element (e.g., a button press), the XR browser can display one or more additional elements for configuring the immersive experience. In one example, an additional element displayed can include a permissions panel where the user can provide permission to enter the immersive experience and/or permission for access to the user's system (e.g., microphone access, camera access, etc.) during the immersive experience. In another example, an additional element displayed can include a configuration panel where the user can provide input that configures the immersive experience, such as an initial location within a three-dimensional environment the user will be taken to, a user presence for the immersive experience (e.g., avatar selection), or any other suitable input for configuring the immersive experience.

Upon receiving the input at the browser chrome element/initiating the trigger for the immersive experience, the artificial reality browser can transition from displaying a two-dimensional panel view of a webpage supported by loaded web resources (e.g., hypertext transfer protocol (HTTP) pages, graphic images, etc.) to a three-dimensional environment supported by preloaded immersive resources (e.g., three-dimensional models, graphic images, etc.) In some implementations, the two-dimensional panel view of a webpage is not displayed during the immersive experience.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Conventional browsers do not provide both two-dimensional and immersive user experiences and/or fail to provide an efficient mechanism for transitioning between these experiences. For example, a conventional browser that supports an immersive experience generally relies on the entry mechanism (e.g., triggering button or interface component) to be defined and displayed by a webpage. In other words, the entry point is variable based on where a web designer opts to place the entry point and/or how the webpage is displayed at the browser. Due to this variance, users are often confused by how to trigger the immersive experience. In addition, conventional browsers lack a consistent mechanism that informs the user that an immersive experience is available, loaded, and/or ready for interaction. Thus, these browsers fail to provide an efficient user interface.

Implementations include an XR browser that permits a browser chrome component to be configured by web code/content according to an API call. For example, once an immersive experience is loaded (e.g., once the immersive resources that define the experience are preloaded), an API call to the XR browser can modify a parameter of the browser chrome component. This modified parameter can modify the display of the browser chrome component, signaling to the user that the immersive experience is available, and serves as an entry point to the immersive experience.

Implementations of this configurable browser chrome component provide a user notice that an immersive experience is part of a web page, when an immersive experience has loaded, and a consistent entry point for immersive experience(s). For example, multiple immersive experiences (e.g., across multiple third-party providers/designers) can support an entry point using the same (or a similar) browser chrome component and functionality. This consistency achieves an improved user interface and eliminates sources of user confusion.

Several implementations are discussed below in more detail in reference to the figures. FIG. 1 is a block diagram illustrating an overview of devices on which some implementations of the disclosed technology can operate. The devices can comprise hardware components of a computing system 100 that trigger an immersive display at an XR browser. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, XR browser manager 164, and other application programs 166. Memory 150 can also include data memory 170 that can include, e.g., web content, JavaScript files, graphical files (e.g., bitmaps, .png, .jpeg, and the like), immersive content models (e.g., VFX models, three-dimensional models, mesh models, etc.), user data, avatar data, permissions and/or preferences data, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
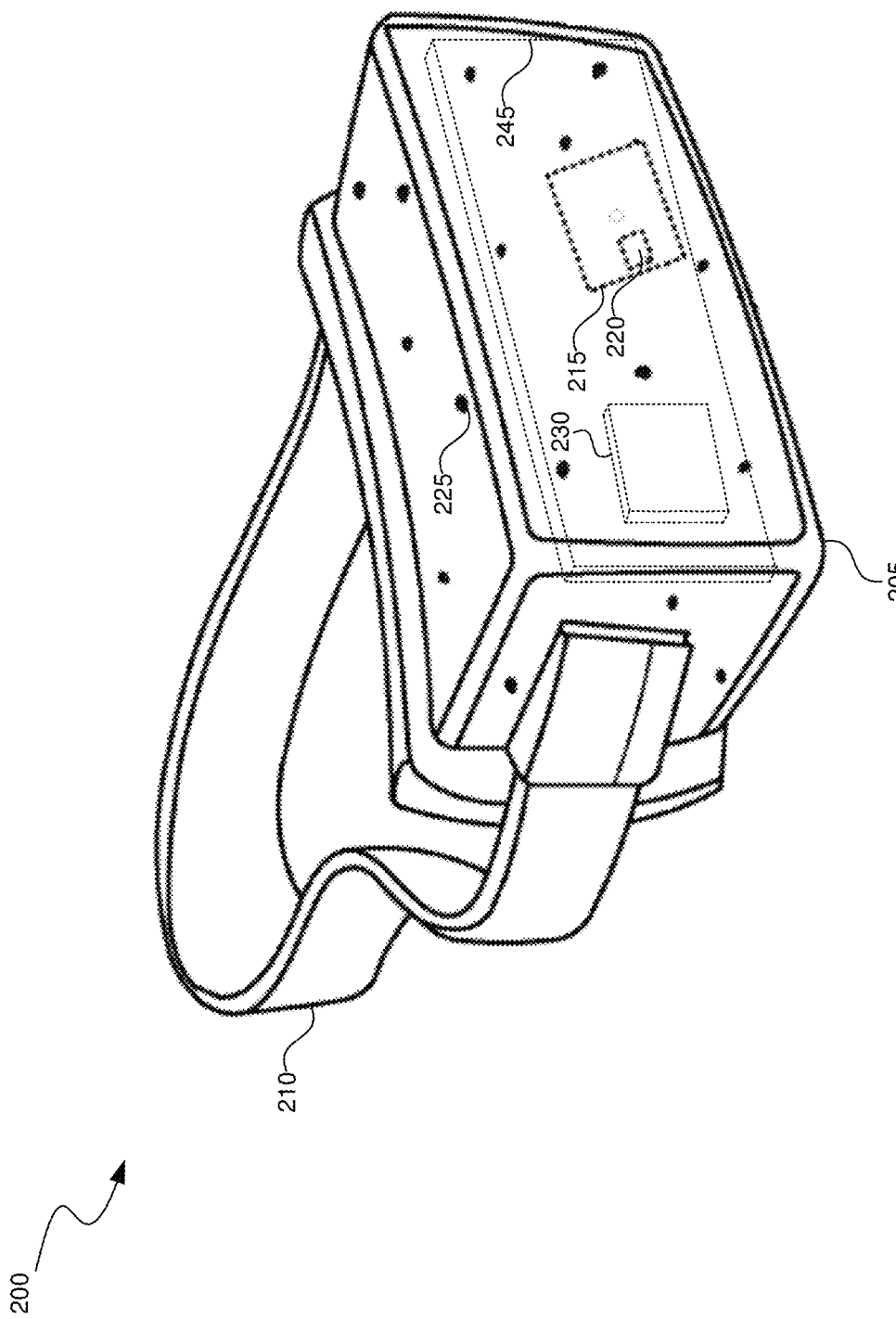
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
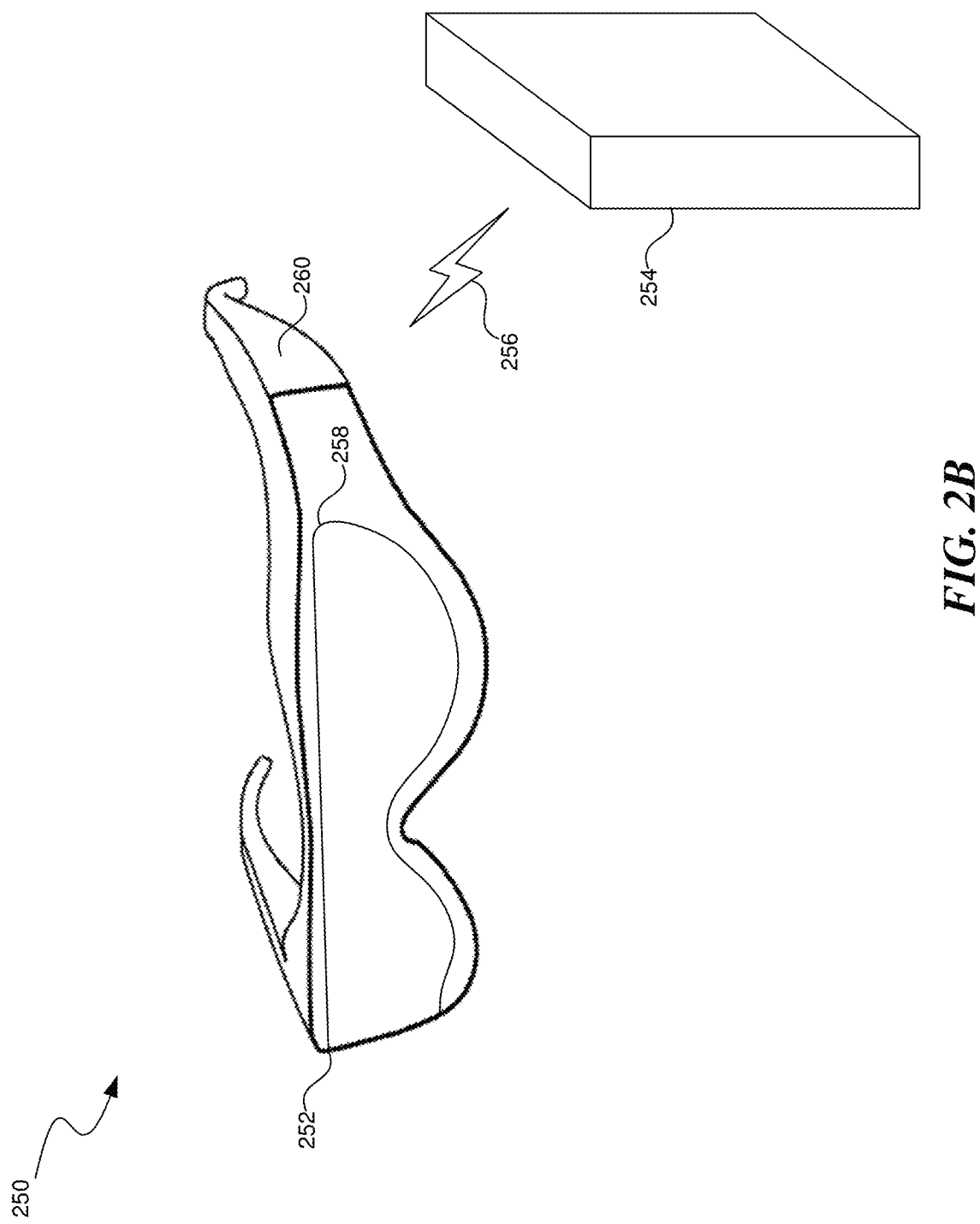
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
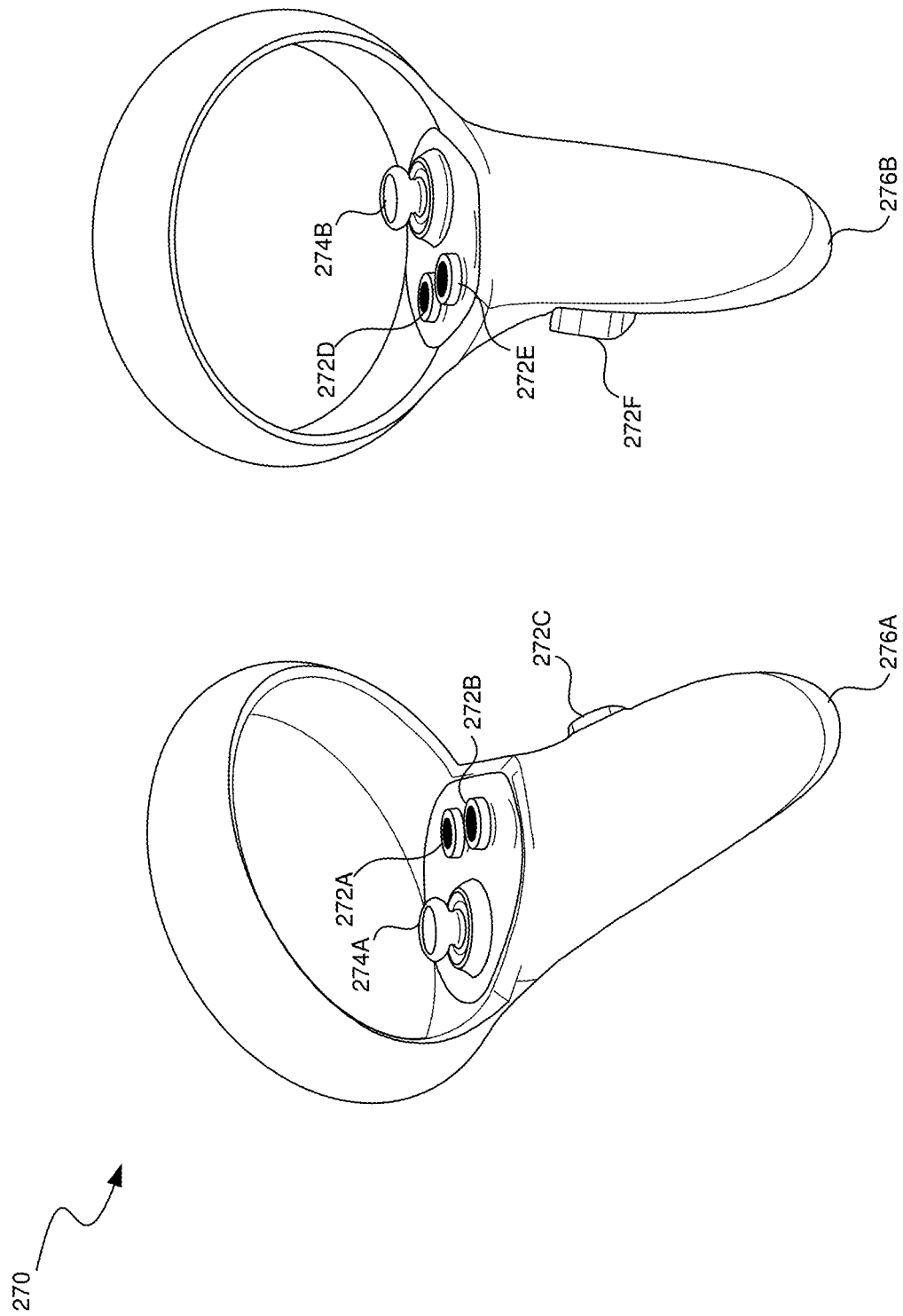
FIG. 2C is a wire diagram illustrating controllers which, in some implementations, a user can hold in one or both hands to interact with an artificial reality environment.

FIG. 2C illustrates controllers 270 (including controller 276A and 276B), which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
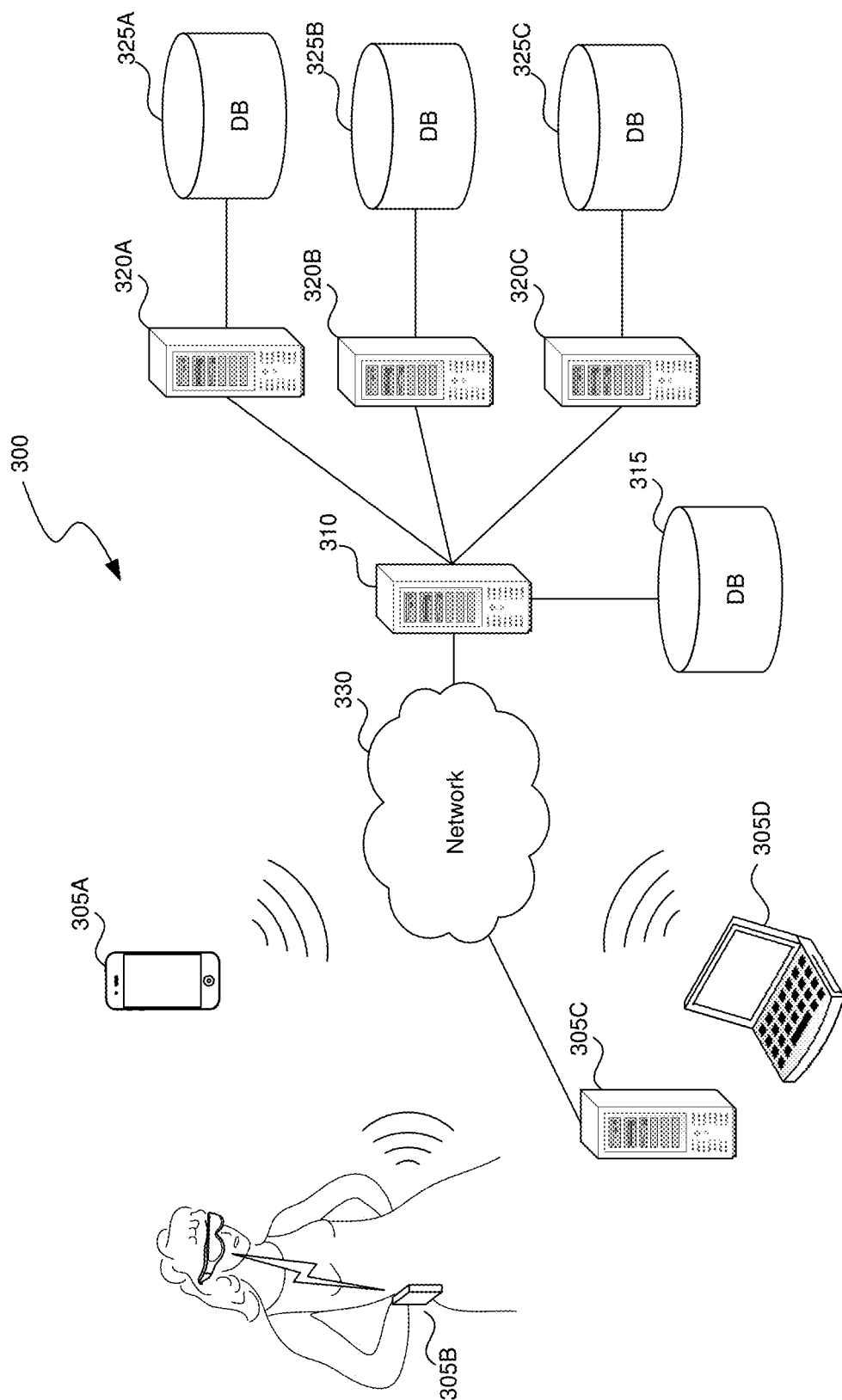
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
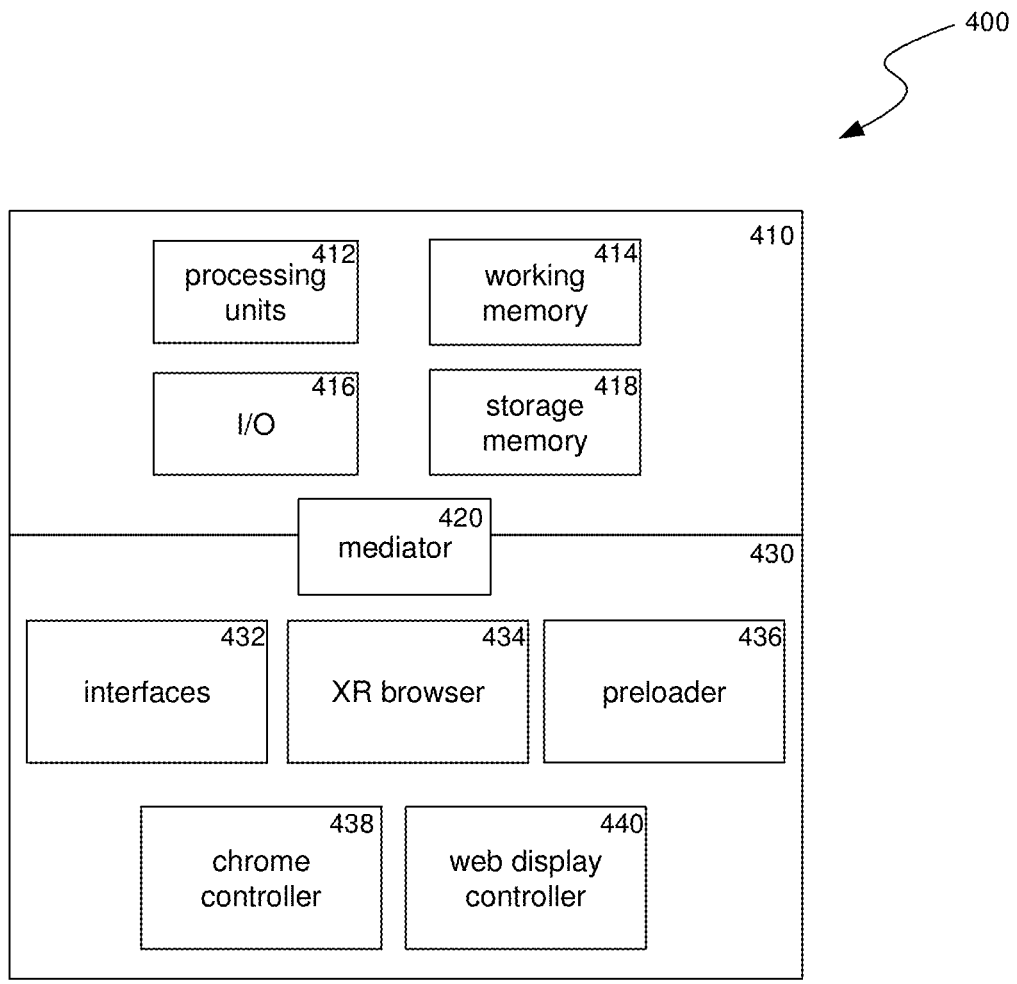
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for triggering an immersive experience at an XR browser. Specialized components 430 can include XR browser 434, preloader 436, chrome controller 438, panel controller 440, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

XR browser 434 can display web content at a user system, such as a two-dimensional webpage or a three-dimensional immersive experience. Implementations of XR browser 434 load web resources from a web host, content distribution network, cache, or any other suitable source of web content. The user system can be an XR system, a smartphone, or any other suitable client device capable of rendering an immersive experience (e.g., three-dimensional environment).

XR browser 434 can include at least two components. A first component can be a browser component that includes a browser chrome and a second component can be a web display that displays web content. For example, the first component can include an interface for interacting with and/or configuring the browser itself. In some implementations, chrome controller 438 can control the browser chrome component of XR browser 434. The second component can display received/retrieved/stored web content at XR browser 434. For example, the second component can include a panel window that displays two-dimensional webpages. In another example, the second component can include an immersive volume that displays a three-dimensional environment for an immersive experience (e.g., a three-dimensional artificial reality environment).

In some implementations, XR browser 434 can run at least two portions of code. A first code portion can be browser code that implements functionality for the XR browser 434 itself (e.g., functionality for the first component of XR browser 434) and a second code portion can be web code that implements webpage/immersive experience functionality (e.g., functionality for the second component of XR browser 434). Implementations of the browser code can be first-party code (e.g., native code at the user system, cloud-based code for the XR browser, or other suitable first-party code) and implementations of the web code can be third-party code (e.g., code received/retrieved from a web source). In some implementations, the browser code can expose an API to the web code such that an API call from the web code can configure an element of the browser chrome (e.g., first component of XR browser 434). For example, after the web code loads the resources that support an immersive experience, the web code can make an API call that configures an element at the browser chrome (e.g., a button).

Preloader 436 can preload and/or dynamically load web resources, such as web resources that implement an immersive experience. In some implementations, XR browser 434 can retrieve/receive one or more webpages from a web host/web source and display a webpage, such as a landing webpage. For example, the user can navigate the landing webpage (or any other suitable webpage) while preloader 436 loads, in the background, resources that support an immersive experience.

Preloader 436 can be implemented by web code, a combination of browser code and web code, or any other suitable code. For example, one or more portions of JavaScript code can load immersive resources that implement the immersive experience (e.g., retrieve the immersive resources from a web source, configure/initialize the immersive resources using a script, etc.) Example immersive resources include JavaScript resources (e.g., files, scripts, etc.), graphical resources (.jpeg, .png, .bitmap, etc.), model resources (e.g., three-dimensional models, mesh models, vfx models, etc.), binary resources (e.g., executable files), or any other suitable immersive resources. Once preloader 436 completes the loading of a set of immersive resources associated with an immersive experience, portions of the web code can execute an API call to the browser code/chrome controller 438 to configure an element of the browser chrome, such as a button or other suitable interface element. For example, one or more "onload" methods implemented by the web code can return indication(s) that one or more resources are loaded, and the API call can be performed in response to these indication(s). In some implementations, the API call and resultant configuration of the element of the browser chrome (e.g., button) can indicate to a user that the immersive experience is loaded and ready for user interaction.

Chrome controller 438 can control a chrome browser component of XR browser 434. The browser chrome can include interface elements (e.g., buttons, menus, tabs, or other suitable interface elements) for configuring the XR browser 434. Example browser chrome elements include back, forward, and refresh buttons, an address bar, one or more bookmarks, one or more menus and/or panels (e.g., user preference interfaces, history interfaces, etc.) plug-in/add-on elements, and other suitable browser chrome elements. In some implementations, chrome controller 438 can expose an API such that web code can call the API and configure an element at the browser chrome.

For example, chrome controller 438 can receive the API call and configure a button at the browser chrome based on the API call. In some implementations, web code can make the API call in response to immersive resources being loaded and/or configured at XR browser 434. Chrome controller 438 can set/modify a property for the button according to the API call. In one example, the button may not have been previously displayed at the browser chrome, and the set/modified property can cause the button to be displayed. In another example, the button may have been displayed with an inactive status (e.g., greyed out, unable to receive push/press input), and the set/modified property can cause the button to be activated (e.g., cause a change of coloring for the button, change a functionality for the button such that a push/press input can be received). In yet a further case, the button may be visible when the website contains an immersive experience and can indicate a download progress (e.g., status bar) for the immersive experience, becoming actionable to activate the immersive experience when the immersive experience content has been retrieved. Any other suitable element of the browser chrome and/or element property can be configurable by the API call.

In some implementations, in response to input received at the browser chrome, chrome controller 438 can cause an interface to be displayed, such as a menu or window. Input received at the displayed interface can configure the immersive experience/three-dimensional environment. For example, the interface can request permissions from a user, such as permission to enter the immersive experience, permission to access one or more devices at the user system (e.g., microphone, camera, controller, and the like), or other suitable permissions. When permissions are granted by the user, web display controller 440 can transition the web display from a two-dimensional webpage to the immersive experience, and the device(s) can be accessed during the immersive experience according to the granted permissions.

In another example, the user can provide configuration input via the displayed interface. The configuration input can include a location within the immersive experience, a user presence (e.g., user avatar) for the immersive experience, and other suitable configuration information. Web display controller 440 can transition the web display from a two-dimensional webpage to the immersive experience according to the configuration input received at the interface. For example, the immersive experience can be displayed at the specified location within a three-dimensional environment and/or a user's presence during the immersive experience can be defined by the specified avatar/presence input.

Web display controller 440 can control a web display component of XR browser 434. For example, the web display component can display a two-dimensional webpage and/or a three-dimensional environment (e.g., XR environment of the immersive experience). In some implementations, the two-dimensional webpage can be defined by received/retrieved webpage data (e.g., HTTP files, JavaScript files, images, etc.) In some implementations, the three-dimensional environment can be defined by received/retrieved immersive resources, such as one or more models (e.g., shells, vfx models, wireframes, etc.), graphic files (e.g., backgrounds, images spread over wireframes, shells, and/or models, etc.), code (e.g., JavaScript, binary files, etc.), and other suitable immersive resources.

Web display controller 440 can transition from display of the two-dimensional webpage to the three-dimensional environment (for the immersive experience) at the web display component of XR browser 434, such as in response to user input received at an element of the browser chrome (e.g., button push/press, permission grants, etc.) In some implementations, web display controller 440 can also transition from display of the three-dimensional environment to the two-dimensional display at the web display component of XR browser 434 in response to user input.

Figure 5:
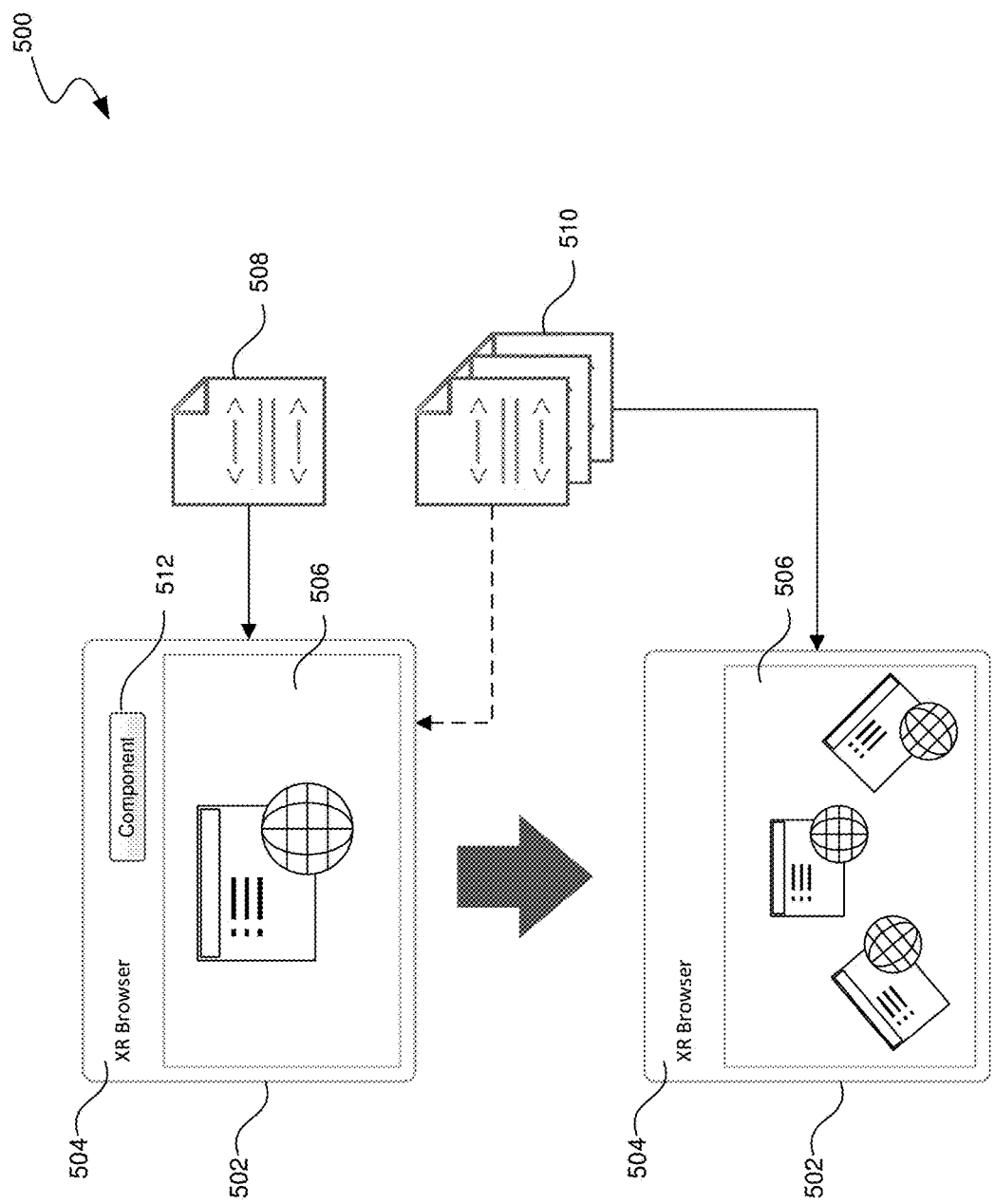
FIG. 5 is a system diagram illustrating components for an artificial reality browser configured to trigger an immersive experience.

Implementations can improve transitions between a two-dimensional display (e.g., webpage display) and a three-dimensional display (e.g., immersive experience) at an XR browser using a XR browser chrome component that can be configured by web code/content via an API call to the XR browser. FIG. 5 is a system diagram illustrating components for an artificial reality browser configured to trigger an immersive experience. System 500 includes XR browser 502, browser chrome 504, web display component 506, web resource(s) 508, immersive resource(s) 510, and chrome element 512.

XR browser 502 can include browser chrome 504 and web display component 506. Browser chrome 504 can display interface elements (e.g., buttons, menus, forms, etc.) that configure the XR browser itself. Web display component 506 can display content received/retrieved from a data network (e.g., the Internet), such as web pages, immersive experiences (e.g., three-dimensional environments), and/or other third-party web content.

In some implementations, web display component 506 can display one or more webpages using web resource(s) 508 (e.g., HTTP files, JavaScript files, images, and the like). For example, web resource(s) 508 can be loaded at XR browser 502 (e.g., received/retrieved from a host service, content delivery network, cache, or any other suitable source for web content), and two-dimensional webpages defined using web resource(s) 508 can be displayed at web display component 506.

Implementations of XR browser 502 can preload immersive resource(s) 510 (e.g., receive/retrieve from a host service, content delivery network, cache, or any other suitable source for web content, initialize, configure, or otherwise preload) while one or more webpage(s) are displayed at web display component 506. For example, XR browser 502 my load web resource(s) 508 faster than immersive resource(s) 510, e.g., in some instances where the immersive resource(s) 510 are larger in size than web resource(s) 508 (and for other suitable reasons). After web resource(s) 508 are loaded and one or more webpages are displayed at web display component 506, XR browser 502 can preload immersive resource(s) 510 in the background. In this example, a user can navigate and/or interact with the displayed webpages while immersive resource(s) 510 are being loaded.

Once XR browser 502 successfully loads immersive resource(s) 510, web code that implements the webpages displayed at web display component 506 can perform an API call to XR browser 502. The API call can configure a component of browser chrome 504. For example, the API call can set a property for chrome element 512. In some implementations, the API call can set a display property for chrome element 512 (e.g., transition the display from hidden/not displayed to displayed), set an interaction setting for the chrome element (e.g., transition an inactive button that cannot receive a press input—i.e., a "grayed-out" version, to an active button), or configure chrome element 512 in any other suitable manner. In some cases, the chrome element 512 can display an indication of the process of loading the immersive resource(s) 510, e.g., by showing the component 512 as a status bar indicting the amount of the immersive resource(s) 510 that have been preloaded.

FIG. 5 illustrates chrome element 512 as a button, however any other suitable element can be implemented. After the API call configures chrome element 512, a display for the element can be modified. For example, chrome element 512 can be displayed at browser chrome 504 (where the element was previously not displayed), chrome element 512 can undergo a color change (e.g., greyed out button to a colored button), text at chrome element 512 can be displayed/modified (e.g., blank text or text that indicates loading in progress can be modified to text that indicates the immersive experience is loaded, such as "Loaded", "Go", or any other suitable text), or any other suitable display modification can occur. The modification to the display of chrome element 512 can indicate to a user that the immersive experience is loaded and ready for user interaction.

In some implementations, a user of XR browser 502 can provide input at chrome element 512 to trigger entry into the loaded immersive experience. For example, chrome element 512 can be a button and (after modification) a button press action can trigger XR browser 502 to transition from a two-dimensional display of a webpage to a three-dimensional display of an immersive experience. In some implementations, browser chrome 504 and a panel that displayed two-dimensional webpages at XR browser 502 can be hidden (e.g., not displayed) during the immersive experience/display of the three-dimensional environment.

Figure 6A:
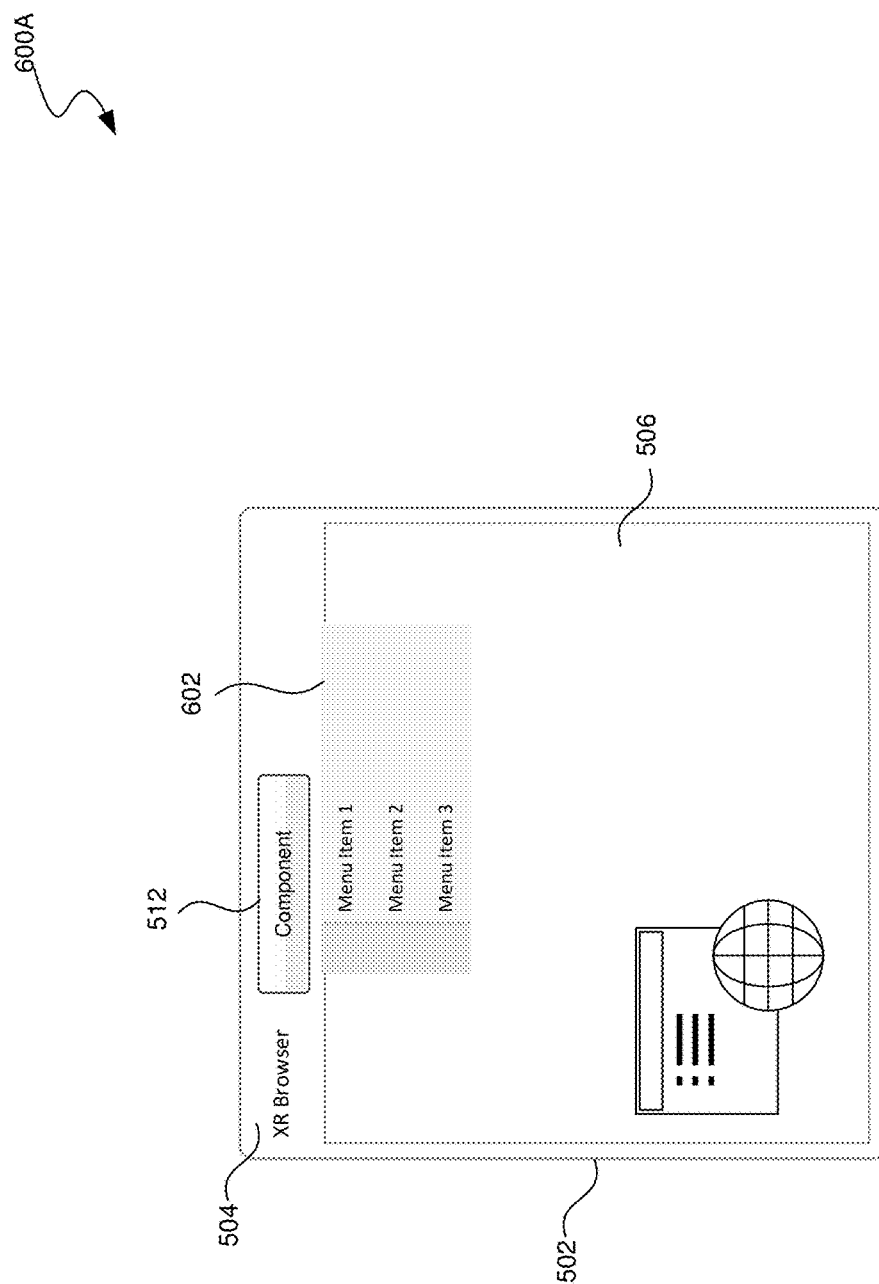
FIGS. 6A and 6B are diagrams for configuring an immersive experience triggered using an artificial reality browser.
Figure 6B:
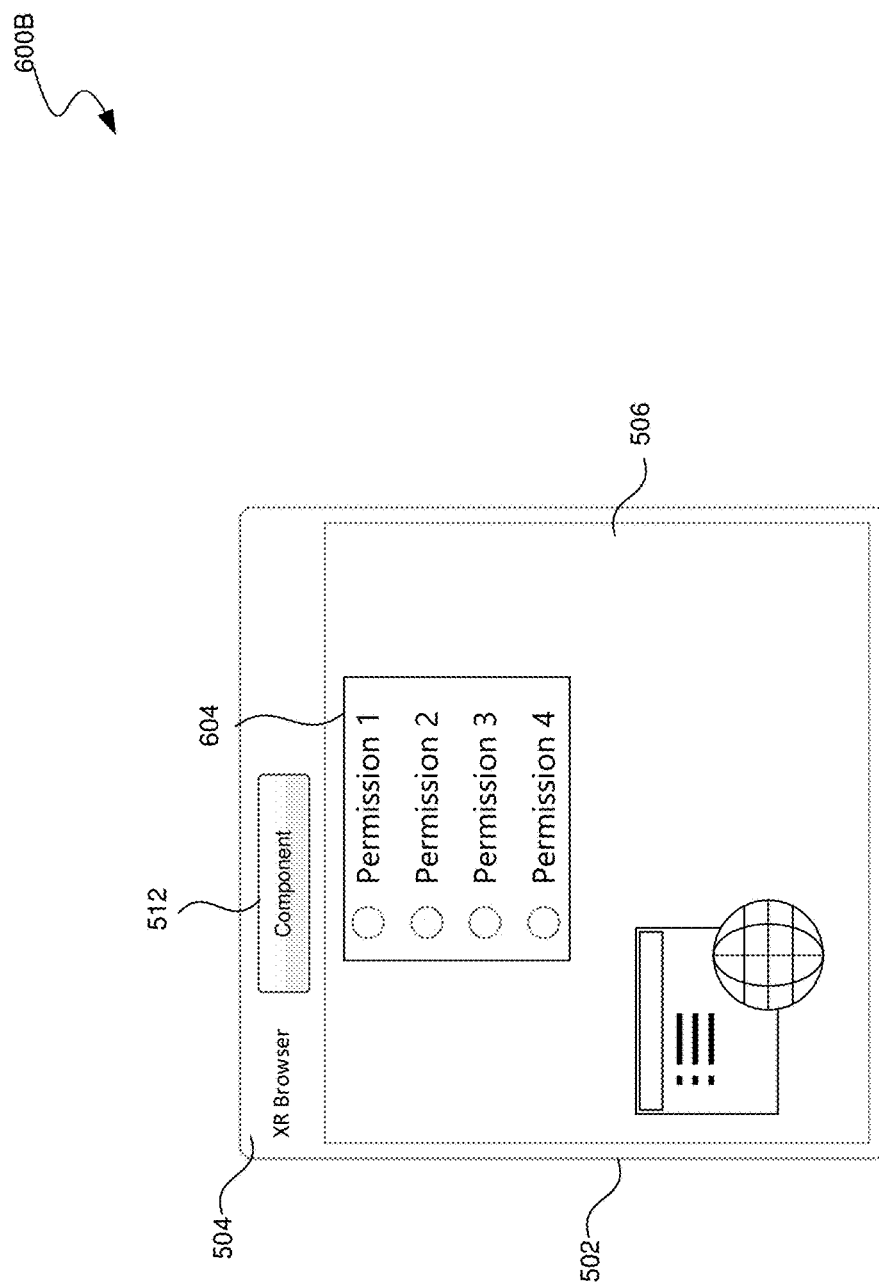
Figure 7A:
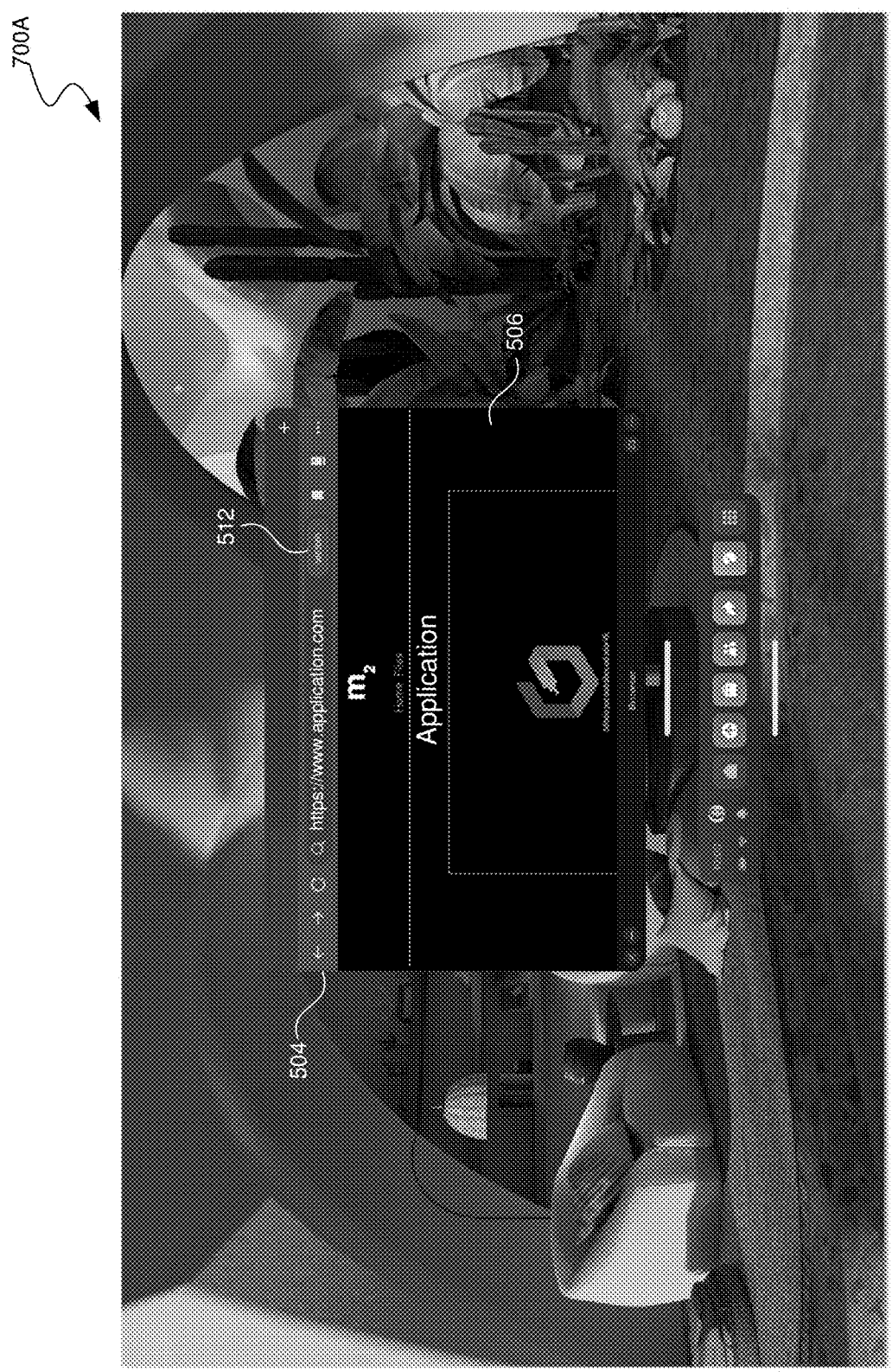
FIGS. 7A, 7B, 7C, and 7D illustrate a series of diagrams that visualize an artificial reality browser configured to trigger an immersive experience.
Figure 7B:
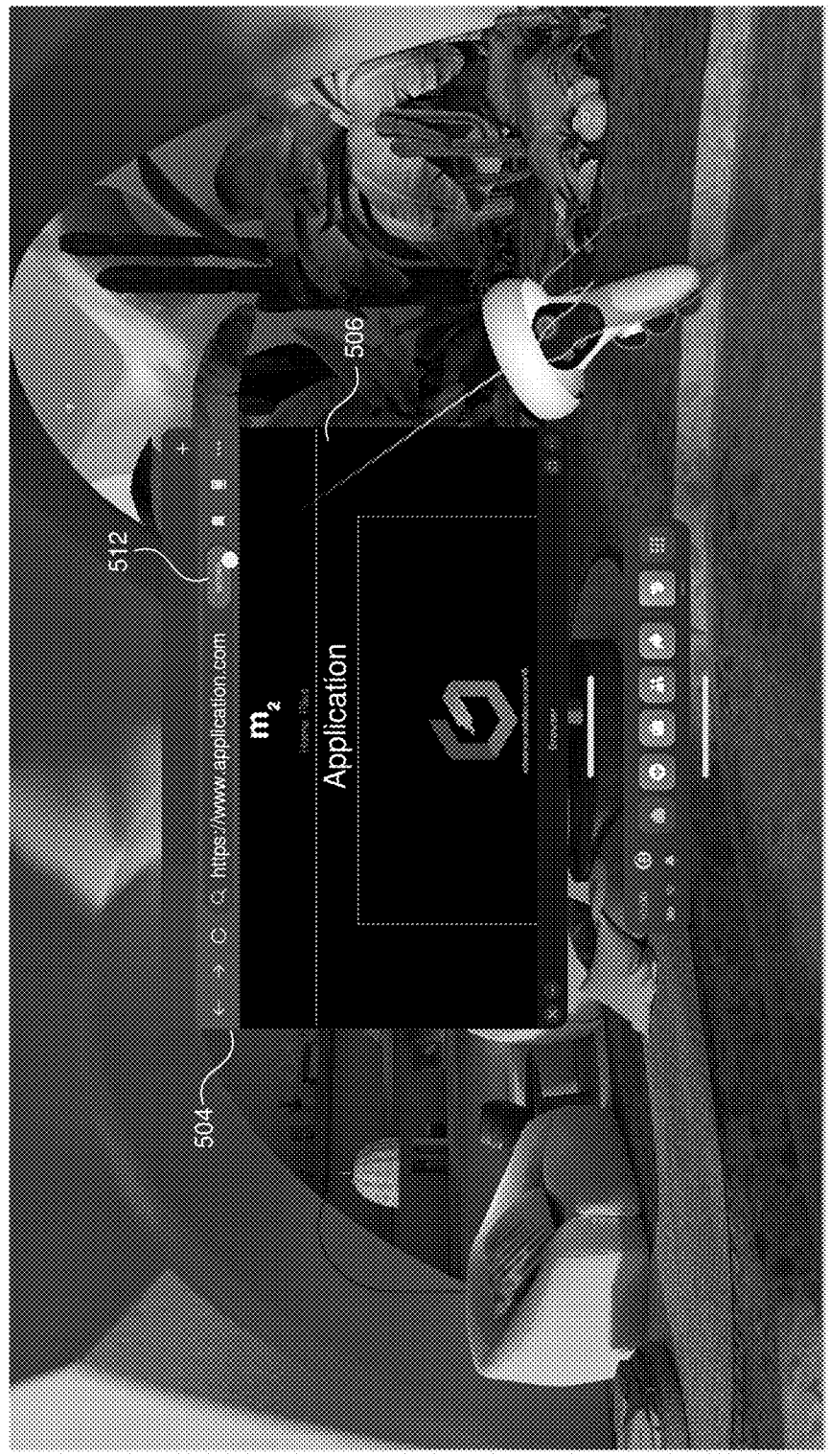
Figure 7C:
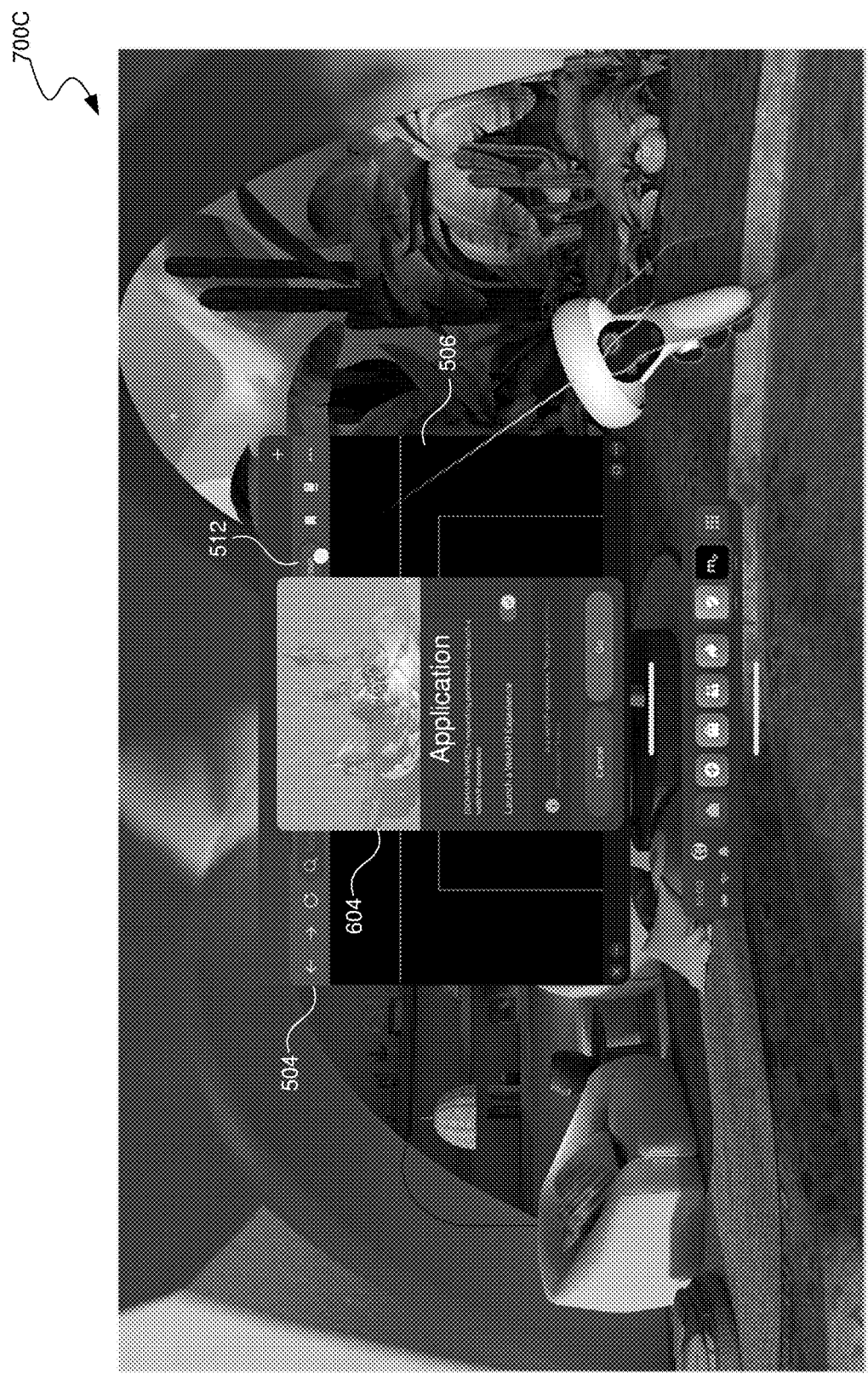
Figure 7D:
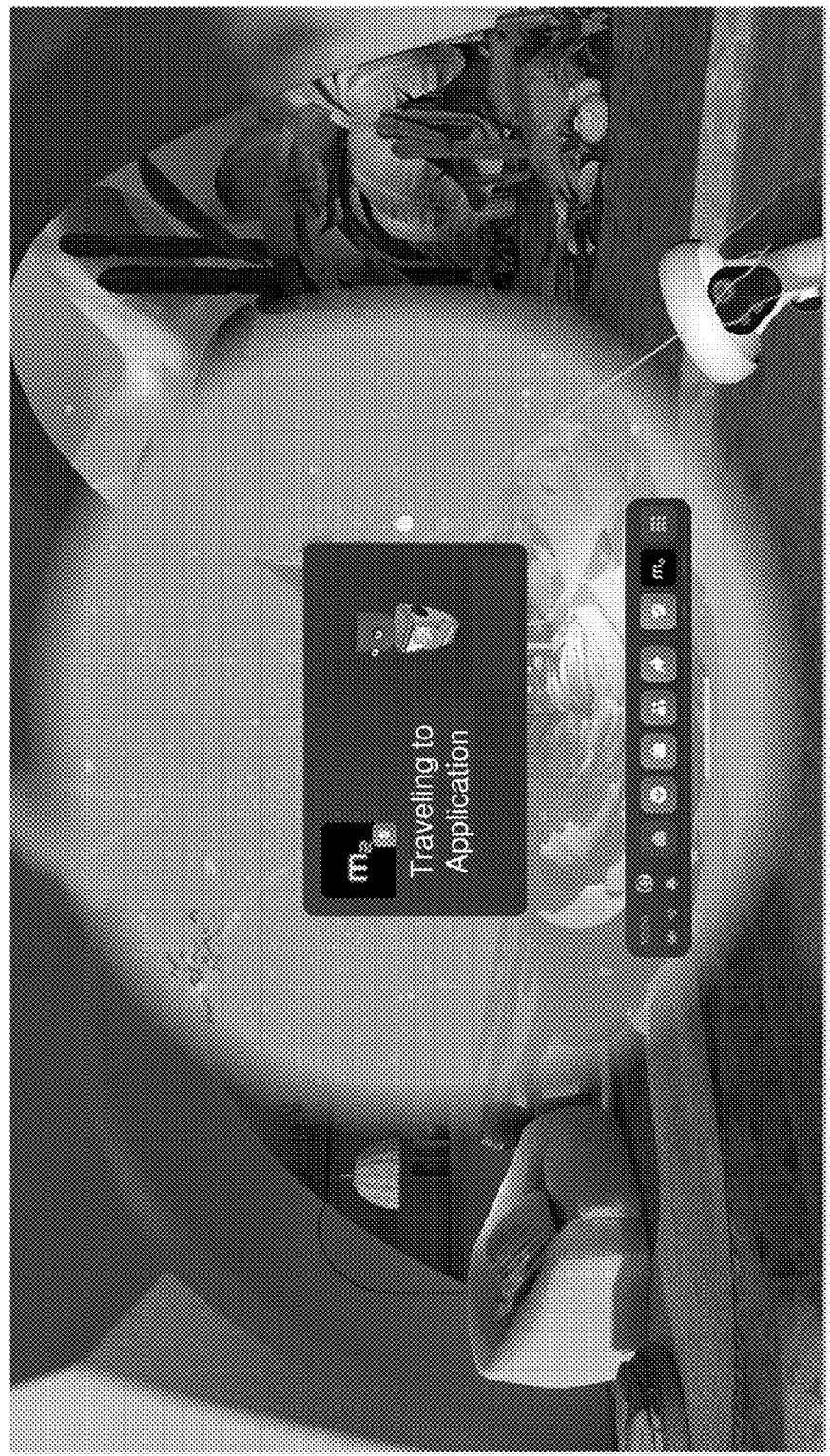

In some implementations, a button press (or any other suitable input) at chrome element 512 (after modification) can cause XR browser 502 to display one or more additional interfaces to configure the immersive experience prior to entry. FIGS. 6A and 6B are diagrams for configuring an immersive experience triggered using an artificial reality browser. Diagrams 600A and 600B include XR browser 502, browser chrome 504, web display component 506, chrome element 512, menu component 602, and permissions component 604.

Diagram 600A illustrates that menu component 602 is displayed by XR browser 502 in response to input received at chrome element 512. Menu component 602 can display menu items for configuring the immersive experience according to user input. An example menu item can be a location within the immersive experience at which the immersive experience with begin when loaded. In some implementations, a dropdown menu (or other suitable prepopulated menu) that includes a set of locations within the immersive experience/three-dimensional environment can be displayed to the user, and the user can select one of these locations to configure the immersive experience.

Another example menu item can be a user's presence within the immersive experience. In some implementations, a dropdown menu (or other suitable prepopulated menu) that includes preconfigured/preloaded user presence options (e.g., avatars, default avatars for the immersive experience, custom avatars configured for/by the user, etc.) can be displayed to the user, and the user can select one of these user presence options to configure the immersive experience. In another implementation, the menu item can generate a web form that permits the user to select a file location (e.g., local to the user's system, or in any other suitable location), and the selected file can define a user avatar. In this example, the user can upload a file that supports the user's presence in the immersive experience.

Diagram 600B illustrates that permissions component 604 is displayed by XR browser 502 in response to input received at chrome element 512. Permissions component 604 can retrieve input from the user that grants permissions related to the immersive experience. Example permissions include: a) permission to enter the user into the immersive experience; b) permission to access devices on the user's system (e.g., camera(s), microphone(s), sensor(s), or other suitable devices); c) permission to access a user's social media information; d) permission to permit other users within the immersive experience/three-dimensional environment to communicate and/or interact with the user; or e) any other suitable permissions.

Any other suitable element(s) (e.g., display panels, prompts, and the like) can be implemented to receive configuration information and/or permissions for the immersive experience form a user. Once the immersive experience is configured with options and/or permission, XR browser 502 can transition from the two-dimensional display of a webpage to the three-dimensional display of an immersive experience, e.g., as illustrated in FIGS. 7A-7D.

FIGS. 7A, 7B, 7C, and 7D illustrate a series of diagrams that visualize an artificial reality browser configured to trigger an immersive experience. Each of diagrams 700A, 700B, and 700C depict a display at XR browser 502 of FIG. 5. Diagrams 700A, 700B, and 700C include browser chrome 504, web display component 506, and chrome element 512 of FIG. 5. In diagram 700A, a webpage is displayed at web display component 506. Browser chrome 504 displays an active chrome element 512, which indicates that immersive resources have been preloaded by XR browser 502 in some implementations.

Diagram 700B illustrates that a user interacting with a user system (e.g., XR system) has selected/pressed chrome element 512. Diagram 700C illustrates that, in response, XR browser 502 displays permissions component 604 of FIG. 6. For example, the permissions component can secure permissions from the user. Diagram 700D illustrates that, in response to the user selecting the "Go" button at permissions component 604, a transition is provided from a two-dimensional webpage display to a three-dimensional immersive experience display at XR browser 502. For example, the XR browser 502 can display a three-dimensional environment to provide the user with the immersive experience. In some implementations, browser chrome 504 and/or a panel portion of display component 506 (e.g., a panel display for a two-dimensional webpage) are not displayed during the immersive experience.

Those skilled in the art will appreciate that the components illustrated in FIGS. 1-5, 6A, 6B, 7A, 7B, 7C, and 7D described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 8:
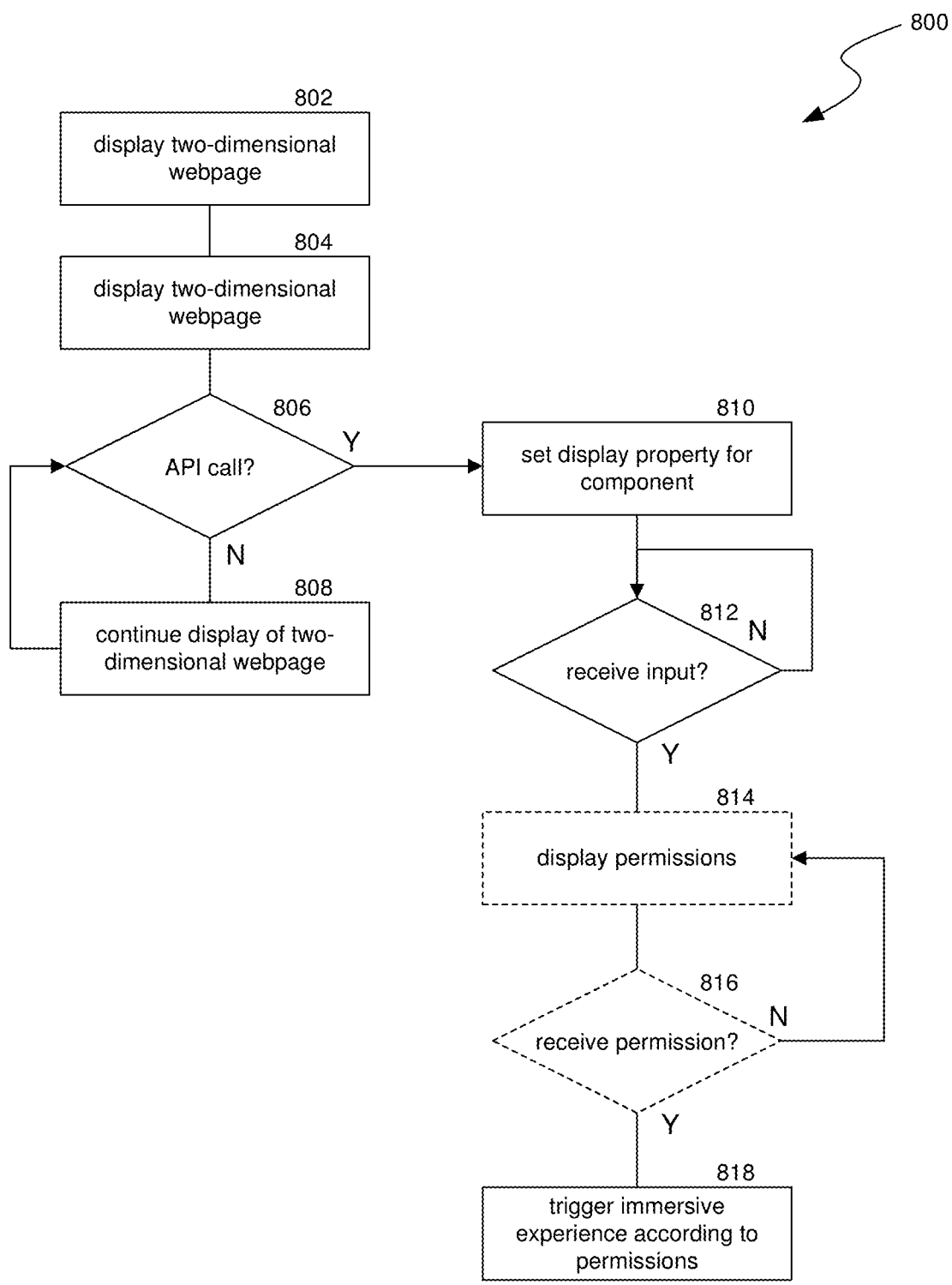
FIG. 8 is a flow diagram illustrating a process used in some implementations of the present technology for triggering an immersive experience at an artificial reality browser.

FIG. 8 is a flow diagram illustrating a process used in some implementations of the present technology for triggering an immersive experience via an artificial reality browser. In some implementations, process 800 can be performed when loading a webpage at an XR browser. Process 800 can load an immersive experience (e.g., three-dimensional environment) and trigger a display transition at an XR browser from a two-dimensional webpage to a three-dimensional immersive experience.

At block 802, process 800 can display, at an XR browser, a two-dimensional webpage according to received web resources that define the webpage. For example, the XR browser can include a browser chrome that displays an interface for the XR browser and a web component that displays web content according to web resources received/retrieved by the XR browser. One or more webpage(s) can be displayed that are defined by web resources (e.g., HTTP pages, HTML, XML, JavaScript, images, links, etc.) received/retrieved by the XR browser, such as from a host service, content distribution network, cache, or any other suitable source of web content. In some implementations, the displayed webpage is a home page or a landing page of a website.

At block 804, process 800 can preload immersive resources at the XR browser. In some implementations, the immersive resources can include one or more JavaScript resources, graphical resources, model resources, binary resources, or any combination thereof. For example, the web resources that define the displayed webpage may be loaded faster than the immersive resources that define the immersive experience/three-dimensional environment, so the immersive resources may be loaded in the background while the user interacts with the web resources. The XR browser can preload the immersive resources while the webpage is displayed to the user and/or while the user interacts with or navigates the displayed webpage.

At block 806, process 800 can determine whether an API call has been received. For example, the received web resources or the preloaded immersive resources can issue an API call to the XR browser, such as when the web site begins loading with the call to indicate the site has immersive content that is being preloaded or once an immersive experience is loaded and/or initialized. In some implementations, the webpages are implemented by web code, and the web code can issue the API call once a set of immersive resources that define the immersive experience are identified or preloaded.

When the API call has been received, process 800 can progress to block 810. When the API call has not been received, process 800 can progress to block 808. At block 808, process 800 can continue to display the two-dimensional webpage. For example, the XR browser can display the two-dimensional webpage until process 800 determines, at block 806, that the API call is received (or the user navigates away from the current webpage).

At block 810, process 800 can set a property for a browser chrome component in response to the API call. For example, the set property can modify a display of the browser chrome component. In some implementations, the modification to the display of the browser chrome component by the set property transitions the browser chrome component from hidden to displayed. For example, the browser chrome component can be a button, and the button may not be displayed by the browser chrome prior to the API call. In response to the API call and the set property of the button, the XR browser can dynamically display the button at the browser chrome.

In some implementations, the modification to the display of the browser chrome component by the set property transitions the browser chrome component from a non-interactive component that is not configured to receive user input to an interactive component that is configured to receive user input. For example, the browser chrome component can be a button, and the button may be displayed in an inactive state (e.g., greyed out, without a mouseover display modification, etc.) by the browser chrome prior to the API call. In response to the API call and the set property of the button, the XR browser can dynamically modify the display of button to indicate an active status (e.g., modify the display color, text, activate a mouseover display modification, etc.). The browser chrome component associated with the API call can be any other suitable component.

At block 812, process 800 can determine whether input is received at the browser chrome component. For example, a user can interact with the browser chrome component (e.g., press a button, check a box, double click, grab, etc.). When input is received at the browser chrome component, process 800 can progress to block 814. When input is not received at the browser chrome component, process 800 can remain at block 812 until the input is received at the browser chrome component. For example, the XR browser can continue to display the two-dimensional webpage and the modified browser chrome component (e.g., modified according to the property set at block 810) until process 800 determines that input is received at the browser chrome component.

While any block can be removed or rearranged in various implementations, blocks 814 and 816 are shown in dashed lines to indicate there are specific instances where blocks 814 and/or 816 are skipped. At block 814, process 800 can display one or more permission prompts at the browser chrome. For example, the permission prompts can retrieve user permissions for the immersive experience, such as permission to enter the user into the immersive experience, permission to access devices on the user's system (e.g., camera(s), microphone(s), sensor(s), or other suitable devices), permission to access a user's social media information, permission to permit other users within the immersive experience/three-dimensional environment to communicate and/or interact with the user, or any other suitable permissions.

At block 816, process 800 can determine whether permission to enter the immersive experience is received from the user. When permission is received from the user, process 800 can progress to block 818. When permission is not received, process 800 can loop back to block 814 until user permission is received.

At block 818, process 800 can trigger a display transition from the two-dimensional webpage to the immersive experience. The immersive experience can be displayed according to the preloaded immersive resources. In some implementations, the immersive experience includes a three-dimensional environment. In some implementations, devices at a client system that implement the XR browser are activated during the triggered immersive experience in response to input relative to the permission prompts. For example, the devices can include one or more of a microphone, a camera, a controller, a sensor, or any combination thereof.

Figure 9:
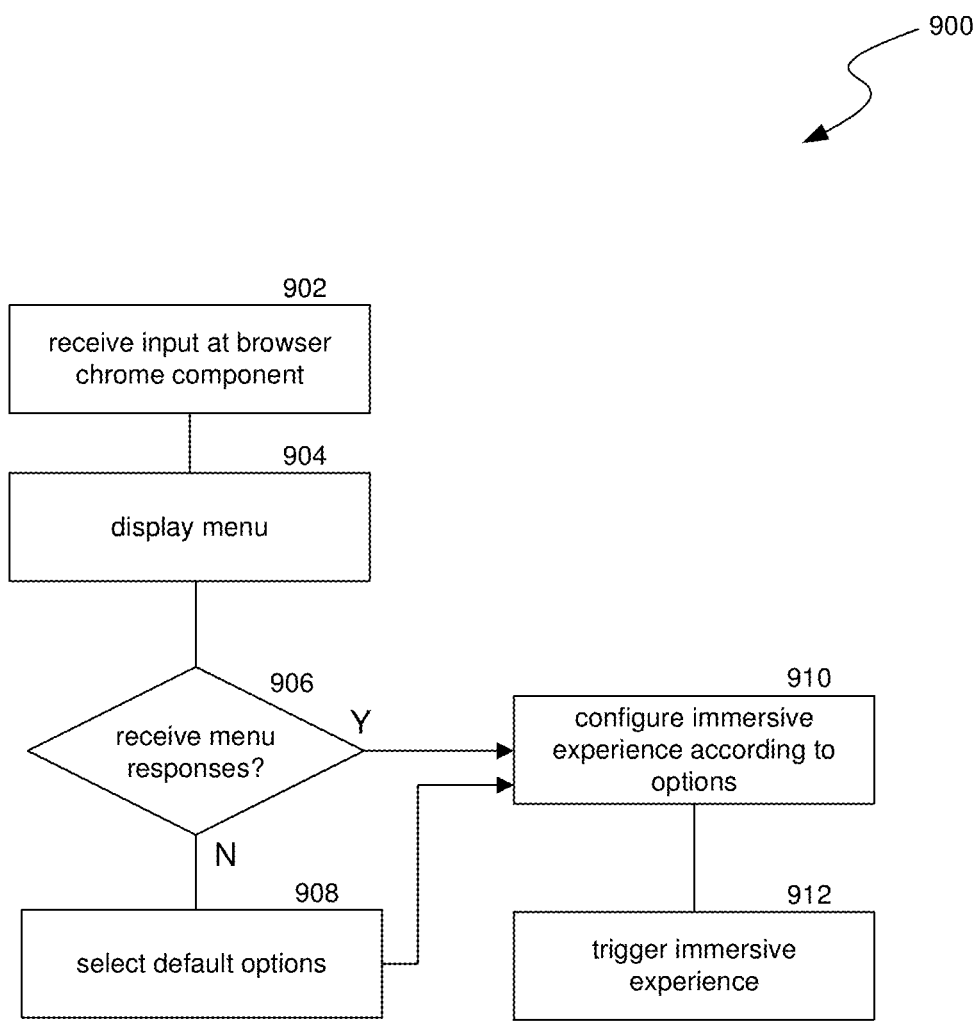
FIG. 9 is a flow diagram illustrating a process used in some implementations of the present technology for triggering a menu configured immersive experience at an artificial reality browser.

FIG. 9 is a flow diagram illustrating a process used in some implementations of the present technology for triggering a menu configured immersive experience at an artificial reality browser. In some implementations, process 900 can be performed when loading a webpage at an XR browser. Process 900 can load and configure an immersive experience (e.g., three-dimensional environment) and trigger a display transition at an XR browser from a two-dimensional webpage to a three-dimensional immersive experience.

At block 902, process 900 can receive input at a browser chrome component. For example, the browser chrome component can be part of a browser chrome of an XR browser. An API call (made by web code that implements webpage(s) displayed at the XR browser) can modify the browser chrome component. For example, the API call can be performed when a set of immersive resources are preloaded at the XR browser. In some implementations, the modification to the browser chrome component and the received input can be similar to the browser chrome component and user input at blocks 810 and 812 of FIG. 8.

At block 904, process 900 can display a menu in response to the input received at the browser chrome component. For example, the menu can include configuration options for configuring the immersive experience/three-dimensional environment according to user input. An example menu item can be an initial location within the immersive experience. In some implementations, a dropdown menu (or other suitable prepopulated menu) that includes a set of locations within the immersive experience/three-dimensional environment can be displayed to the user, and the user can select one of these locations to configure the immersive experience.

Another example menu item can be a user's presence within the immersive experience. In some implementations, a dropdown menu (or other suitable prepopulated menu) that includes preconfigured/preloaded user presence options (e.g., avatars, default avatars for the immersive experience, custom avatars configured for/by the user, etc.) can be displayed to the user, and the user can select one of these user presence options (or a set of avatar configuration options—e.g., styles, face shape, skin tone, etc.) to configure the immersive experience. In another implementation, the menu item can generate a web form that permits the user to select an avatar definition object location (e.g., local to the user's system, cloud based, or in any other suitable location), and the selected avatar definition object can control how the user appears in the immersive experience. In this example, the user's avatar is dynamically loaded at the XR browser for the immersive experience and/or the user can upload an avatar definition object that supports the user's presence in the immersive experience.

At block 906, process 900 can determine whether menu responses are received. For example, the user may select one or more options for the immersive experience, or opt not to make selections at the displayed menu. When menu responses are received, process 900 can progress to block 910. When menu responses are not received, process 900 can progress to block 908.

At block 908, process 900 can select default configuration options for the immersive experience. For example, in the absence of user selections, default locations and/or default user presence options can configure the immersive experience. The default options can be generic default options for several users or default options stored for the specific user (e.g., based on historic data stored about the user's interactions with the immersive experience/three-dimensional environment).

At block 910, process 900 can configure the immersive experience according to the configuration options. For example, user input can select a location for the immersive experience within a three-dimensional environment, a user presence for the immersive experience, or other suitable configuration options. In another example, one or more default options can be selected for the immersive experience when the user opts not to make one or more selections. Configuring the immersive experience can include loading/initializing the three-dimensional environment at the selected location and/or loading/initializing the user's presence selection/avatar. At block 912, process 900 can trigger a transition to the immersive experience according to the configuration. For example, the XR browser can display the user's presence according to the selection at the selected location in a three-dimensional environment that implements the immersive experience.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for triggering an immersive experience at an artificial reality (XR) browser, the method comprising:

displaying, at the XR browser, a two-dimensional webpage according to received web resources that define the webpage, wherein the XR browser comprises a browser chrome that displays an interface for the XR browser and a web component that displays web content according to web resources received by the XR browser;

preloading a plurality of immersive resources at the XR browser, the immersive resources comprising one or more JavaScript resources, graphical resources, model resources, binary resources, or any combination thereof;

receiving, from the received web resources or the preloaded immersive resources, an application programming interface call (API) that indicates the immersive resources are preloaded;

setting a property for a browser chrome component in response to the API call, wherein the set property modifies a display of the browser chrome component; and triggering, based on input relative to the browser chrome component, a display transition from the two-dimensional webpage to the immersive experience, wherein the immersive experience is displayed according to the preloaded immersive resources.

2. The method of claim 1, wherein the browser chrome component comprises a button and the input relative to the browser chrome component comprises a button press.

3. The method of claim 1, wherein the modification to the display of the browser chrome component by the set property comprises a) transitioning the browser chrome component from hidden to displayed; or b) transitioning the browser chrome component from a non-interactive component that is not configured to receive user input to an interactive component that is configured to receive user input.

4. The method of claim 1, further comprising:
displaying, based on the input relative to the browser chrome component, a menu at the browser chrome, the menu including parameters for the immersive experience.

5. The method of claim 4, wherein at least one parameter of the menu comprises a user presence parameter, and a user avatar is included in the triggered immersive experience according to input relative to the user presence parameter of the menu.

6. The method of claim 5, wherein the user avatar is dynamically loaded at the XR browser for the immersive experience in response to the input relative to the user presence parameter of the menu.

7. The method of claim 4, wherein at least one parameter of the menu comprises a location parameter, and a display location within the triggered immersive experience is defined by input relative to the location parameter of the menu.

8. The method of claim 1, further comprising:
displaying, based on the input relative to the browser chrome component, one or more permission prompts at the browser chrome, wherein devices at a client system that implement the XR browser are activated during the triggered immersive experience in response to input relative to the permission prompts.

9. The method of claim 8, wherein the devices include one or more of a microphone, a camera, a controller, a sensor, or any combination thereof.

10. The method of claim 1, wherein the immersive experience comprises a three-dimensional environment.

11. A computer-readable storage medium storing instructions that, when executed by a computing system, cause the computing system to perform a process for triggering an immersive experience at an artificial reality (XR) browser, the process comprising:
displaying, at the XR browser, a two-dimensional webpage according to received web resources that define the webpage, wherein the XR browser comprises a browser chrome that displays an interface for the XR browser and a web component that displays web content according to web resources received by the XR browser;
preloading a plurality of immersive resources at the XR browser;
receiving, from the received web resources or the preloaded immersive resources, an application programming interface call (API) that indicates the immersive resources are preloaded;
setting a property for a browser chrome component in response to the API call, wherein the set property modifies a display of the browser chrome component; and
triggering, based on input relative to the browser chrome component, a display transition from the two-dimensional webpage to the immersive experience, wherein the immersive experience is displayed according to the preloaded immersive resources.

12. The computer-readable storage medium of claim 11, wherein the browser chrome component comprises a button and the input relative to the browser chrome component comprises a button press.

13. The computer-readable storage medium of claim 11, wherein the modification to the display of the browser chrome component by the set property comprises a) transitioning the browser chrome component from hidden to displayed; or b) transitioning the browser chrome component from a non-interactive component that is not configured to receive user input to an interactive component that is configured to receive user input.

14. The computer-readable storage medium of claim 11, wherein the process further comprises:
displaying, based on the input relative to the browser chrome component, a menu at the browser chrome, the menu including parameters for the immersive experience.

15. The computer-readable storage medium of claim 14, wherein at least one parameter of the menu comprises a user presence parameter, and a user avatar is included in the triggered immersive experience according to input relative to the user presence parameter of the menu.

16. The computer-readable storage medium of claim 15, wherein the user avatar is dynamically loaded at the XR browser for the immersive experience in response to the input relative to the user presence parameter of the menu.

17. The computer-readable storage medium of claim 14, wherein at least one parameter of the menu comprises a location parameter, and a display location within the triggered immersive experience is defined by input relative to the location parameter of the menu.

18. The computer-readable storage medium of claim 11, wherein the process further comprises:
displaying, based on the input relative to the browser chrome component, one or more permission prompts at the browser chrome, wherein devices at a client system that implement the XR browser are activated during the triggered immersive experience in response to input relative to the permission prompts, wherein the devices include one or more of a microphone, a camera, a controller, a sensor, or any combination thereof.

19. The computer-readable storage medium of claim 11, wherein the immersive experience comprises a three-dimensional environment.

20. A computing system for triggering an immersive experience at an artificial reality (XR) browser, the computing system comprising:
one or more processors; and
one or more memories storing instructions that, when executed by the one or more processors, cause the computing system to perform a process comprising:
displaying, at the XR browser, a two-dimensional webpage according to received web resources that define the webpage, wherein the XR browser comprises a browser chrome that displays an interface for the XR browser and a web component that displays web content according to web resources received by the XR browser;

preloading a plurality of immersive resources at the XR browser;

receiving, from the received web resources or the preloaded immersive resources, an application programming interface call (API) that indicates the immersive resources are preloaded;

setting a property for a browser chrome component in response to the API call, wherein the set property modifies a display of the browser chrome component; and triggering, based on input relative to the browser chrome component, a display transition from the two-dimensional webpage to the immersive experience, wherein the immersive experience is displayed according to the preloaded immersive resources.

\* \* \* \* \*